United States Patent [19]

Lantrip

[11] Patent Number: 4,589,459
[45] Date of Patent: May 20, 1986

[54] VEHICLE PROTECTIVE COVER

[75] Inventor: Larry J. Lantrip, Cocolalla, Id.

[73] Assignee: Mervyn Shapiro, Sagle, Id.; a part interest

[21] Appl. No.: 694,431

[22] Filed: Jan. 24, 1985

[51] Int. Cl.⁴ .............................................. B60J 11/00
[52] U.S. Cl. ................................ 150/52 K; 150/52 R; 296/136
[58] Field of Search .......................... 150/52 K, 52 R; 296/136; 24/686

[56] References Cited

U.S. PATENT DOCUMENTS

| | | | |
|---|---|---|---|
| 1,584,518 | 5/1926 | Drake | 296/37.1 X |
| 1,679,886 | 8/1928 | Wright | 150/52 K |
| 1,769,727 | 7/1930 | Walters | 24/686 X |
| 2,048,461 | 7/1936 | Mosgoffian | 150/52 K |
| 2,119,072 | 5/1938 | Cohen | 280/150 |
| 2,620,007 | 12/1952 | Keller | 150/52 K |
| 2,646,097 | 7/1953 | Gaverth et al. | 150/52 K |
| 2,787,311 | 4/1957 | Cohen et al. | 150/52 K |
| 3,763,908 | 10/1973 | Norman | 150/52 K |
| 4,041,999 | 8/1977 | Miller | 150/52 K |
| 4,209,197 | 6/1980 | Fischer | 150/52 K X |
| 4,219,218 | 8/1980 | Waldon | 296/136 X |
| 4,376,546 | 3/1983 | Guccione et al. | 150/52 K X |
| 4,531,560 | 7/1985 | Balanky | 150/52 K |

FOREIGN PATENT DOCUMENTS

| | | | |
|---|---|---|---|
| 1933669 | 11/1970 | Fed. Rep. of Germany | 150/52 K |
| 2543891 | 10/1980 | France | 296/136 |
| 438980 | 12/1967 | Switzerland | 296/136 |
| 246268 | 1/1926 | United Kingdom | 296/136 |

Primary Examiner—William Price
Assistant Examiner—Sue A. Weaver
Attorney, Agent, or Firm—Wells, St. John, & Roberts

[57] ABSTRACT

Protective covers for use on vehicles. The covers include a front portion having a front panel, attached hood panel and front side panels. The hood panel and front side panels are adapted to allow them to be detachably connected along the outside edge of the hood panel, thereby providing essentially continuous coverage of the hood and lower front side walls of the vehicle. The front side panels extend backwardly beyond the rear edge of the vehicle doors to overlap with a rear portion of the cover. The rear portion of the protective cover includes rear side panels which extend down the rear exterior side walls of the vehicle. The rear side panels are preferably connected together at the rear and provided with adjustment so that the rear side panels can be drawn taut against the vehicle. Intermediate portions can also be included where the vehicle being protected includes four doors. Fasteners can advantageously be used at points about the wheel wells and lower edges of the side panels to help secure the protective cover on the vehicle.

13 Claims, 11 Drawing Figures

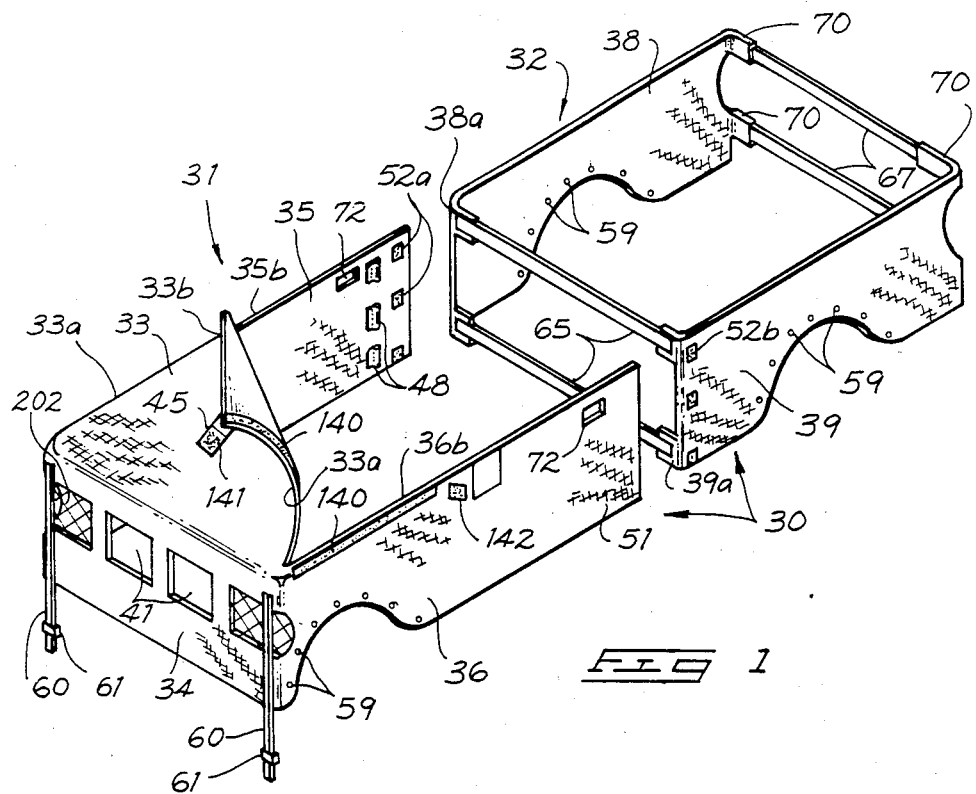
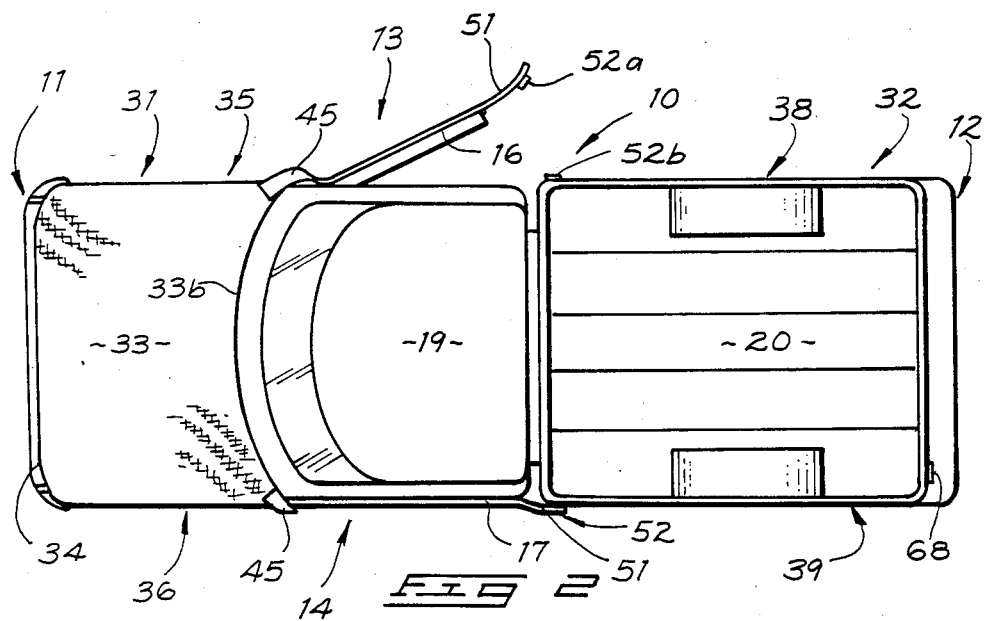
FIG 1
FIG 2

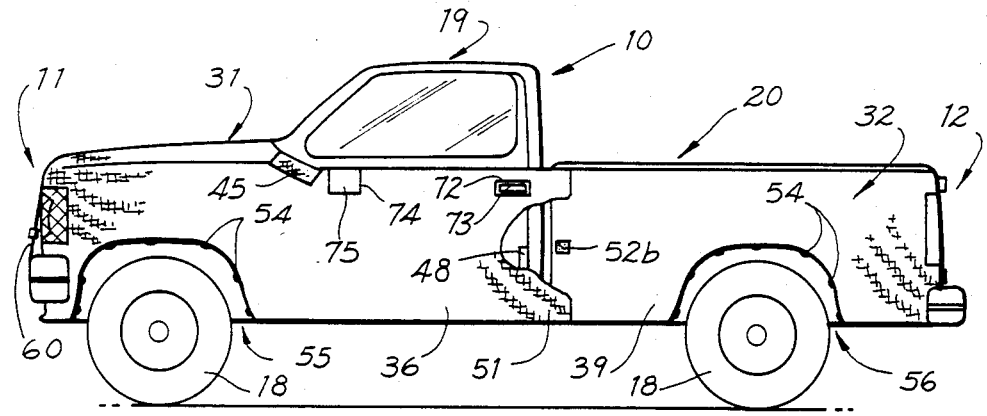
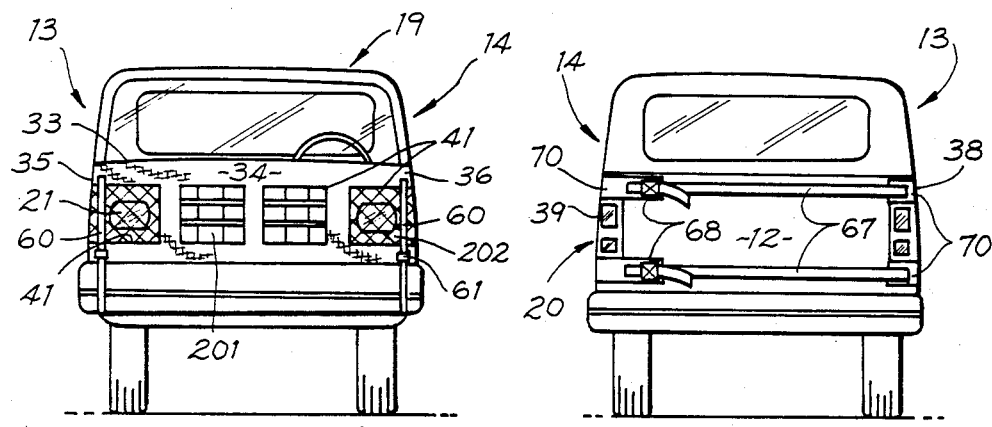
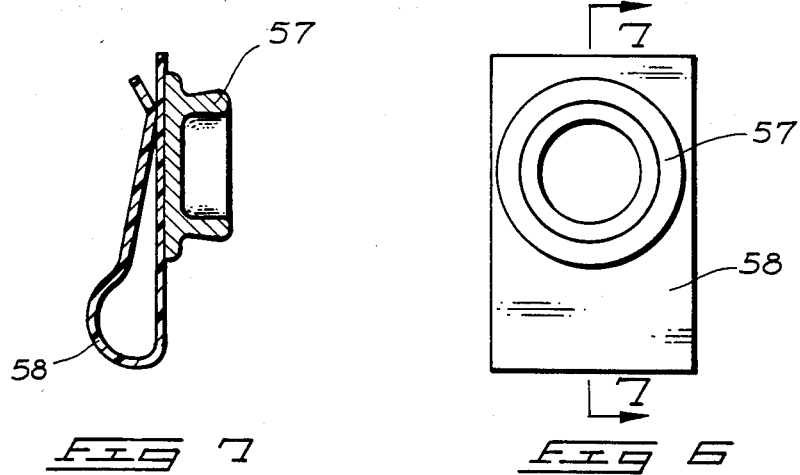

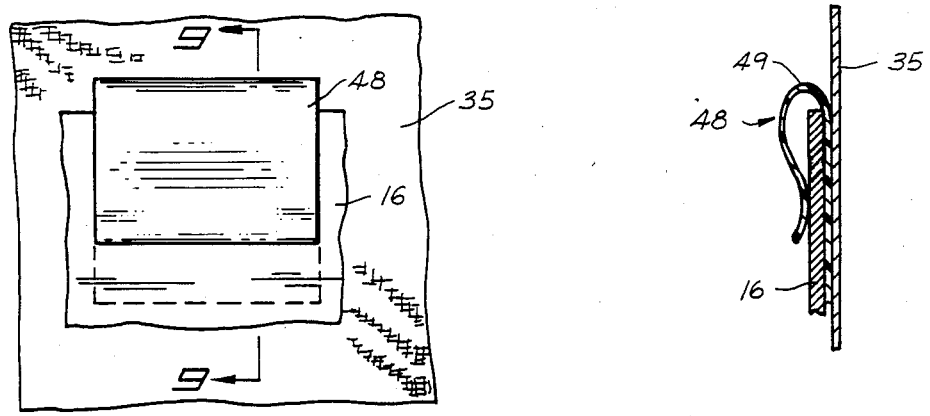
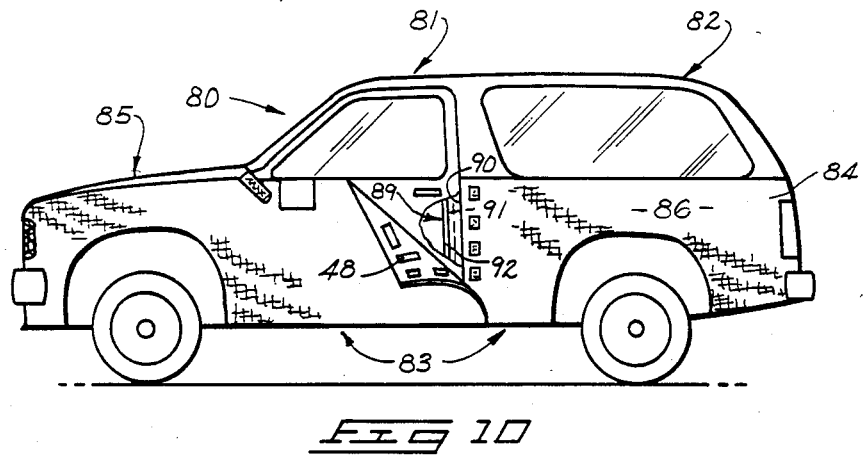
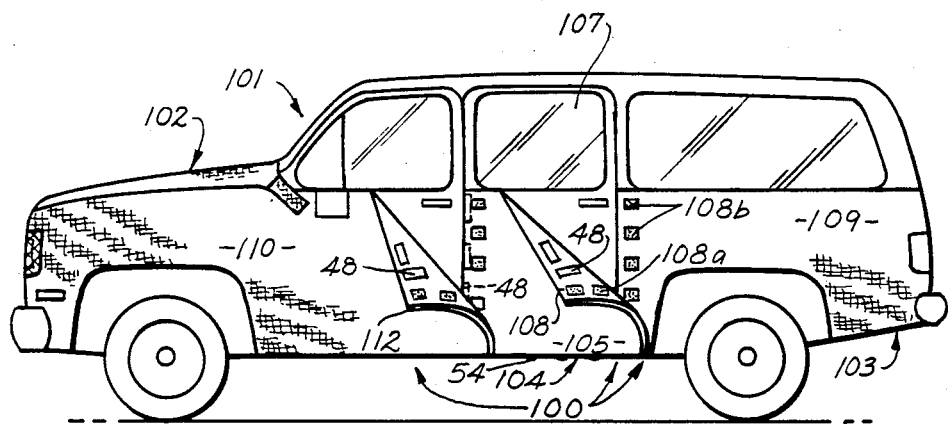

VEHICLE PROTECTIVE COVER

TECHNICAL FIELD

The technical field of this invention is detachable protective covers for use on vehicles.

BACKGROUND

The cost of vehicles such as automobiles, pickup trucks and sport utility vehicles has continued to increase, thereby increasing the desire of owners of these vehicles to maintain them in good condition over a long useful life. Many motor vehicles are used on primitive roads and in cross country use where the exterior paint is exposed to scratching and abrasion from rocks, brush, tall grasses, tree branches and other potentially injurious objects. Since the cost of repairing and repainting vehicles with scratched and abraded paint is high, most owners do not undertake this work and their vehicles show resulting rust and significant depreciation in value.

Protective coverings for vehicles are not entirely new as indicated by U.S. Pat. No. 1,584,518 to Drake for an auto cover. The auto cover shown by Drake consisted of two parts. One part covered the hood of the vehicle and portions of the front fenders and running boards. The second part of the Drake auto cover covered the roof, back portions of the cab, and portions of the rear fenders. The Drake cover was secured in position by a plurality of snaps or other fasteners which were mounted along the peripheral edges and in some cases at intermediate points.

Despite the apparent benefits of the Drake auto cover, it is apparent that it did not attempt to protect important parts of the vehicle which are commonly subject to damage. The Drake protective cover did not protect the front of vehicles, thereby allowing rock chips and damage by brush and tree limbs to easily occur to front surfaces of the vehicle. The Drake protective cover also did not attempt to protect major portions of the vehicle sides, apparently because of the difficulties associated with having easy ingress and egress from the vehicle. The Drake auto cover further did not protect frontal portions of the rear fenders which would be highly susceptible to damage from brush and rocks particularly in off-road and primitive road use.

The prior art also includes U.S. Pat. No. 4,041,999 to Miller for a vehicle protector. The vehicle protector disclosed in the Miller patent comprised three sets of flexible panels. The three sets of panels were mounted along the sides of the vehicle at the front fender, doors, and rear side panels. The Miller invention did not provide protection for the vehicle front including the grill and hood areas. Miller also did not have continuous protection for the sides of the vehicle since adjacent panels do not overlap, thereby providing access for rocks, brush and other objects. The Miller invention used elastic bands, snaps and mechanical hook fasteners to retain the panels on the vehicle.

SUMMARY OF THE INVENTION

It is an object of this invention to provide a protective cover for vehicles which can be used to protect exterior surfaces from abrasion, marring and scratching while the vehicle is being driven.

It is another object of this invention to provide a protective cover for vehicles which covers the front, hood, and lower exterior side walls of the vehicle completely, yet allows convenient ingress and egress through the vehicle doors.

It is a further object of this invention to provide a vehicle protective cover which experiences minimum amounts of flapping and noise and which is capable of use at relatively high speeds.

Still further objects of this invention are to provide a vehicle protective cover which is easy to install and remove from the vehicle, and which is economical to manufacture.

Additional objects, advantages and novel features of the invention will be set forth in the description given herein and will be apparent to those of ordinary skill in the art upon examination of this document or upon practicing of the invention.

To achieve the foregoing and other objects, the protective vehicle covers of this invention may advantageously comprise a front part for covering and protecting front portions of the vehicle, and a rear part for covering and protecting rear portions of the vehicle. The front part of the protective cover advantageously includes a front panel which extends across the front of the vehicle. Front side panels are durably connected to the front panel extending rearwardly therefrom to cover the front side walls of the passenger and driver sides of the vehicle. A hood panel is also advantageously connected to the front panel and extends rearwardly to cover substantially the full hood of the vehicle. The front side panels and hood panel are adapted to interconnect so that the hood panel, side panels and front panels form substantially continuous flexible covering over the adjacent vehicle surfaces. The hood and front side panels are constructed so that the driver's view is not obstructed. The front side panels extend rearwardly to cover the driver and passenger doors using a continuous or effectively continuous piece of flexible material.

The rear part of the protective cover includes two rear side panels which extend rearwardly from a point adjacent the driver and passenger doors to points adjacent the rear of the vehicle. Fasteners can be used at a plurality of positions along the vehicle to secure the protective cover at appropriate points. The front part overlaps the rear part of the cover to provide an effectively continuous protective cover along the full length of the vehicle sides, thereby minimizing the chance for damage to the vehicle and improving the life of the protective cover itself.

Alternative forms of the invention can further include intermediate parts where coverage is desired for four door or similar vehicles. A further alternative form of the invention is adapted to be used on sport utility vehicles or automobiles.

An advantage of the invention it that it provides substantially complete protective covering for the front, hood, and side walls of the entire vehicle. Another advantage of the invention is that it is capable of relatively high speed travel without the usual flapping or destruction experienced by many prior art vehicle covers. A further advantage of the invention is that it provides access to the engine compartment, passenger compartment, and cargo compartments in a convenient and time efficient manner. Other advantages and benefits of the invention will be apparent from the description given herein and with practice of the invention.

BRIEF DESCRIPTION OF THE DRAWINGS

The invention including several alternative embodiments are illustrated in the accompanying drawings, in which:

FIG. 1 is a perspective view showing a preferred protective cover according to this invention approximately as it might be installed upon a vehicle but in isolation from the vehicle;

FIG. 2 is a top plan view showing a vehicle with the protective cover of FIG. 1 installed thereon;

FIG. 3 is a side elevational view of the vehicle and protective cover shown in FIG. 2, a portion has been broken away and removed;

FIG. 4 is a front elevational view of the vehicle and protective cover shown in FIG. 2;

FIG. 5 is a rear elevational view of the vehicle and protective cover shown in FIG. 2;

FIG. 6 is a plan view of a fastener mounting clip used in this invention;

FIG. 7 is a side sectional view of the fastener mounting clip shown in FIG. 6 taken along line 7—7 of FIG. 6;

FIG. 8 is a side view of a mounting clip used to attach the protective cover along the edges of doors and similar vehicle panels;

FIG. 9 is a cross-sectional view of the mounting clip of FIG. 8 taken along line 9—9 thereof;

FIG. 10 is a side elevational view of an alternative form of the invention installed upon a sport utility vehicle, a portion has been broken away and removed; and FIG. 11 is a side elevational view of a further alternative form of the invention installed upon a four door utility vehicle.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

FIGS. 1 through 5 show a preferred protective cover 30 according to this invention for use on a pickup type vehicle 10. Vehicle 10 has a front 11 and rear 12. Passenger side 13 and driver side 14 are provided with passenger door 16 and driver door 17 through which persons gain access to the passenger compartment 19. Vehicle 10 is also provided with wheels 18 and a pickup bed 20.

FIG. 1 shows vehicle protective cover 30 comprising a front portion 31 and a rear portion 32. Front portion 31 comprises a hood panel 33, front panel 34, and two front side panels 35 and 36.

Front panel 34 is designed to extend across the front 11 of vehicle 10. Front panel 34 is preferably provided with a plurality of openings 41 through which air can pass to the vehicle radiator 201 (FIG. 4) and through which light from the vehicle headlights 21 (FIG. 4) can pass to illuminate the roadway. Openings 41 can advantageously be provided with a flexible open mesh material 202 which allows air and light to penetrate therethrough but which is strong and securely attached to provide greater strength to front panel 34.

Front portion 31 includes hood panel 33 which is either integral with or connected to front panel 34. Hood panel 33 extends rearwardly from connection with front panel 34 to a rear edge 33b adjacent the vehicle windshield as shown most clearly in FIG. 2. Hood panel 33 covers substantially the entire hood surfaces of the vehicle, thereby providing protection for such surfaces against scratching and abrasion.

Front portion 31 also comprises passenger front side panel 35 and driver front side panel 36. Front side panels 35 and 36 are connected to or integral with front panel 34. Front side panels 35 and 36 extend backwardly from connection with front panel 34 along the front fenders of the vehicle. Front side panels 35 and 36 also extend to completely cover passenger and driver doors 16 and 17. It is preferable that front side panels 35 and 36 further extend beyond the doors to form flaps 51 which overlie and are preferably detachably connected with rear portion 32 as will be described more fully below.

Front side panels 35 and 36 are held on vehicle 10 using a combination of means. The leading or front edge is held in position in part by its connection with front panel 34 and also in part by the fact that it is drawn taut about the front corners of the vehicle. The top edges 35b and 36b are connected to the side edges 33a of hood panel 33 using suitable means for detachably connecting the hood panel and front side panels together.

A preferred means for accomplishing connection between the hood panel and front side panels uses continuous strips of hook and loop type fastening material 140 well known under the trademark VELCRO. Either the hook or loop material is sewn, adhered or otherwise attached to the underside of hood panel 33 near side edges 33a thereof. The corresponding mating hook or loop material 140 is sewn, adhered or otherwise affixed near the top edges 35b and 36b of front side panels 35 and 36. The hood panel 33 and front side panels 35 and 36 are detachably connected together by intermeshing the hook and loop materials 140. This construction provides ready access to the vehicle engine compartment beneath the hood, and further allows the hood panel and side panels to be adjustably secured together to provide better fitting of the cover over the front part of vehicle 10.

Connection between the hood panel 33 and front side panels 35 and 36 can be further enhanced by including attachment belts 45 at the rearward outside corners of hood panel 33. Attachment belts 45 are preferably provided with pieces of hook or loop type fastening material 141 which interengage with mating pieces 142 attached to front side panels 35 and 36 at appropriate locations. This arrangement allows attachment belts 45 to be drawn tightly down across the front side panels and secured in position by the interengagement of the hook and loop fastener material or other suitable fastening means. The adjustability provided by fastener materials 141 and 142 enhances the ability of hood panel 33 to be drawn taut over the vehicle hood, a requisite for satisfactory use when traveling at high speeds.

Front side panels 35 and 36 are secured in position upon the back edges of vehicle doors 16 and 17 using panel fasteners or clips 48, or other suitable fasteners. Panel clips 48 are preferably constructed using lengths of extruded plastic material formed into a hook type shape as shown in FIG. 9. Panel clips 48 are sewn, adhered, welded, or otherwise affixed to the inside surfaces of front side panels 35 and 36 at appropriate locations to engage the rearward or trailing edge of vehicle door 16 and 17. The hook portions 49 of panel clips 48 extend over and back around the edge of vehicle doors 16 and 17, thereby holding the front side panels in position with the panels drawn tightly against the side of the vehicle when the vehicle doors are closed.

When the vehicle doors are open as shown at 16 in FIG. 2, the front side panels are no longer drawn taut and the front side panels easily flex to allow the door to operate in the usual manner.

Panel clips 48 can also be adapted to clip bottom or other edges of the protective cover panels to portions of the vehicle where flanges or edges of the vehicle so permit, particularly in back of the vehicle wheels 18 to exclude mud. The panel clips 48 or similar clips are positioned over the vehicle flange (not shown) and the particular panel being secured thereto.

FIG. 3 shows that front side panels 35 and 36 preferably extend beyond the rear edge of vehicle doors 16 and 17. The purpose for this rearward extension is to form flaps 51 which overlap rear portion 32. Flaps 51 are preferably attached to rear side panels 38 and 39 using flap connection means 52 comprising mating pieces 52a and 52b of hook and loop type fastening material or other fastener types. Use of hook and loop type fastening material for flap connection 52 is advantageous in that it allows the flap to be easily secured in position by a person reaching through an open vehicle window and pressing the flap to interengage pieces 52a and 52b. Disconnection of flap connection 52 is easily accomplished by merely opening the vehicle door which causes pieces 52a to tear free from mating pieces 52b.

Front side panels 35 and 36 can further be held in position on vehicle 10 using snap or other fasteners 54 which are mounted adjacent the front wheel wells 55 or along the lower edges of the front fender panels. A preferred fastener for attaching front side panels 35 and 36 to the vehicle is shown in FIGS. 6 and 7. FIG. 7 shows a plan view of a clip-snap fastener having a male portion of any suitably sized typical snap type fastener. Male portion 57 is mounted to a spring clip 58 which is easily mounted by inserting the clip over the flange which exists in most vehicles along the edge of wheel well 55 and at other locations. The receiving or female portions 59 of snap fasteners 54 are mounted into the front side panels 35 and 36 at appropriate locations so that the panels can be snapped and fastened tightly to the vehicle to prevent flapping of the panels during high speed travel.

It is alternatively possible to use snap or other type fasteners having one part which mounts permanently to the vehicle such as by screws or rivets, and a second mating part which mounts permanently or detachably in the protective cover. Alternative fastening types will be apparent to those of ordinary skill in the art. Future fastening types may also be developed which may also serve to effectively attach the protective cover to the vehicle at desired locations.

FIG. 1 shows that the front portion 31 can advantageously be provided with flexible bumper straps 60 for providing additional means for securing the front portion to the vehicle. Bumper straps 60 extend about the vehicle front bumper and are adjustable using strap clasp 61, a variety of which are well known in the art. Bumper straps 60 can alternatively be omitted as shown in the alternative protective covers of FIGS. 10 and 11.

Protective cover 30 also includes rear portion 32 which is provided to protect the exterior rear side walls of vehicle 10. Vehicle 10 is a pickup truck having a pickup bed 20. Such pickup beds are typically mounted to a vehicle chassis such that there is a space between the passenger compartment 19 and the pickup bed 20. FIGS. 1 through 5 show a rear portion 32 which is adapted for mounting on such a vehicle or those similar in construction. Rear portion 32 includes passenger rear side panel 38 and driver rear side panel 39 which are adapted for use along the passenger and driver sides 13 and 14 of vehicle 10, respectively. Rear side panels 38 and 39 extend from leading or front edges 38a and 39a near passenger compartment 19, rearwardly to the rear end 12 of vehicle 10. Rear side panels 38 and 39 effectively cover the exterior side walls of the vehicle against scratching and abrasion from brush, rocks, and other objects.

Rear side panels 38 and 39 can be mounted upon the vehicle in a variety of manners depending upon the specific vehicle construction. In the case of pickup truck 10 the rear side panels are attached together by two forward belts 65 which are sewn or otherwise attached to the leading edges of rear side panels 38 and 39. Forward belts 65 are appropriately sized to extend substantially across the front of pickup bed 20 while advantageously allowing some overlap of the rear side panels about the forward corners of pickup bed 20.

Rear side panels 38, 39 are also preferably connected together at the rear of vehicle 10 using rear belts 67 which extend between the trailing or rear ends of side panels 38 and 39. Rear belts 67 are preferably provided with detachable, adjustable clasps 68 (FIG. 5), or other suitable fastening devices. Clasps 68 allow the tautness of belts 67 to be adjusted. The adjustment capability of clasps 68 is desirable so that rear side panels 38 and 39 can be drawn tightly against the side walls of the vehicle. Clasps 68 further allow rear portion 32 to be rapidly removed by quickly disconnecting mating parts of the clasps. This is particularly advantageous in allowing the tailgate to be opened when necessary without removing the entire rear portion.

Rear panel 32 can advantageously include rear panel pieces 70 which are extensions of rear side panels 38 and 39. Belts 67 are easily attached to pieces 70. Pieces 70 also serve to protect rear surfaces 12 of vehicle 10 against wear which might occur from motion of clasps 68.

Rear portion 32 can further be held in position on vehicle 10 using a plurality of fasteners 54 such as described above with regard to front side panels 35 and 36, and shown in FIGS. 7 and 8. Additional fasteners of this type are usually desirable about rear wheel wells 56 to prevent flapping of the rear side panels against the vehicle.

Front and rear portions 31 and 32 can be provided with a wide variety of accessory openings for allowing access to various items such as door handles, fuel tank caps, tool compartments, etc. FIGS. 1 and 3 show front portion 31 with openings 72 allowing access to the door handles 73 of vehicle 10. Front portion 31 is also provided with an auxiliary mirror opening 74 having a flap 75 which covers the opening until needed.

FIG. 9 shows an alternative form of protective cover 83 of this invention as installed upon a sport utility vehicle 80. This form of the invention is also adaptable for use on two door automobiles. The protective cover 83 has a front portion 85 and rear portion 84. Front portion 85 is constructed substantially similar to front portion 31 of cover 30 with any necessary modifications for size and shape of vehicle 80.

Sport utility vehicle 80 does not have an appropriate space between the passenger compartment or cab and the rearward cargo compartment 82. It is therefore impossible or undesirable to use forward belts such as forward belts 65 used in cover 30 described above. Rear portion 84 must be attached along the front edges of rear side panels 86 in an alternative manner.

A preferred form of attaching rear side panels 86 to vehicle 80 uses hook and loop type fastener 89. A first piece 91 which is either the hook or loop part of the material is glued, fastened or otherwise affixed within the protected area along the rearward door jambs 90 of vehicle 80. The second piece 92 is made of mating hook or loop material which is sewn, adhered or otherwise affixed near the forward or leading edge of the rear side panels 86 along the inside surface thereof. These mating pieces of hook and loop fastener material are then pressed together in the usual manner to secure them together, thereby holding the front parts of rear side panels 86 upon vehicle 80.

Rear side panels 86 are preferably mounted at the rear thereof upon vehicle 80 using rear belts (not shown) which are similar to rear belts 67. Such rear belts extend across the rear of the vehicle and preferably include detachable adjustable clasps 68.

Protective covers according to this invention can also be constructed for use on vehicles having four opening doors along the sides of the vehicle. FIG. 11 shows a four door vehicle 101 fitted with a protective cover 100. Protective cover 100 incorporates a front portion 102, rear portion 103, and intermediate portions 104 at each side.

Front portion 102 is similar to front portion 31 described above for use on vehicle 10. Rear portion 103 is similar to rear portion 84 described above with regard to sport utility vehicle 80.

Intermediate portions 104 are used to cover lower portions of rearward doors 107. Intermediate portions 104 consist of rear door protective panels 105 which are provided with front attachment clips 48 for attachment along the leading or forward edges of rear doors 107. Front clips 48 snap into place over the leading edge of the rear door 107 and hold the forward edge of the rear door panels 105 in proper position thereon.

The trailing or rear edges of rear door panels 105 are also provided with clips 48. Rear door panels 105 extend beyond the rearward edges of doors 107 so as to overlap the rear side panels 109 of rear portion 103. Flap 108 is preferably provided with mating hook and loop type fasteners 108a and 108b which interengage to hold flap 108 in place during use.

Rear door panels 105 are similarly overlapped by flap 112 of the front side panels 110 in a similar construction as that described immediately above and with regard to vehicle protective cover 30.

Appropriate fasteners 54 can also be used along the bottom of rear door panels 105 to provide further securement of the panels to the vehicle.

The manner of using the invention will now be considered. Protective covers constructed according to the description given herein can be installed in a number of different manners. Either the front, rear or any intermediate portions can be installed in various orders. Installation of front portions 31, 85 and 102 are accomplished by first positioning the cover over the hood and front fenders of the vehicles. Front panel 34 is then accurately positioned so that the openings are appropriately aligned with the radiator openings and headlights. Front side panels 35 and 36 can be then be extended rearwardly and connected along the trailing edge of vehicle door 16 and 17. Fasteners 54 can then be snapped together along wheel wells 55 and in other locations as may be provided. If bumper straps 60 are also provided then they can be extended about the vehicle front bumper and tightened appropriately to snugly draw the front portion downwardly against the vehicle hood. Hood panel 33 can then be appropriately connected along its side edges to the top edges of front side panels 35 and 36. Attachment belts 45 can further be connected to provide additional attachment between the hood panel 33 and the front side panels 35 and 36. Adjustment of various parts may be necessary to obtain a smooth overall appearance.

Rear portion 32 is conveniently installed by first extending the forward belts 65 between the passenger compartment 19 and pickup bed 20. The rear portion is adjusted so that the forward edges of the rear side panels 38 and 39 overlap the forward corners of the pickup bed. The position of rear portion 32 is also adjusted so that the overlying flaps 51 are positioned so that the flap connection means 52 can interengage the respective connecting parts such as the mating hook and loop type fastening materials 52a and 52b.

The rear side panels 38 and 39 are then extended rearwardly along the sides of the vehicle bed and connected across the rear using the rear belts 67 and clasps 68. Any fasteners 54 can then be appropriately snapped or otherwise affixed into position along the rear wheel wells 67 or at other locations as desired. Adjustable clasps 68 can then be tightened snugly to draw the rear side panels taut along the exterior sides of the vehicle.

Intermediate portions 104 are installed by engaging clips 48 along the front of door 107. Panels 105 are then drawn rearwardly and stretched or otherwise manipulated to allow rear clips 48 to engage the trailing edge of doors 107. Any fasteners 54 are then secured.

The vehicle protective covers according to this invention provide full protection for the vehicle front, hood and full length of both sides. The vehicle can be easily entered despite full protection by actuating the door release in the usual manner and swinging the door outwardly. The geometry of the opening door and its relationship with the front side panels releases any tension existing in the front side panels. The use of the hook and loop type flap connection means 52 and 108 allow the doors to be immediately opened despite the connection of these parts since the hook and loop type fastener will tear away but is resistant to shear and disconnection due to wind forces.

Flaps 51 can be overlaid against the rear side panels 38 and 39 by extending the person's hand from the vehicle window and positioning the flap so that the flap connection means 52 are interengaged. The driver and any passengers are then ready to proceed through hazardous terrain with the benefit of the protection afforded by the invention.

Protective covers according to this invention are preferably constructed of a relatively strong plastic material such as polyvinyl chloride or other suitable material. Such material is preferably provided with a soft fiber backing. The fiber backing is installed adjacent to the painted surfaces of the vehicle so that repeated movement occurring due to the wind does not cause abrasion of the painted vehicle surfaces. The exterior vinyl surface is relatively unaffected by the deposition of mud, water and other debris thereon and can be easily hosed off or washed with soap and water in most instances to remove any accumulations.

When the protective covers are no longer desired for use, they can be easily folded into a compact form and stored for subsequent use.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A protective cover for use on a vehicle having a passenger side with passenger door, driver side with driver door, hood, windshield, front end and rear end; comprising:
    a front portion for covering and protecting frontal parts of the vehicle; said front portion having a passenger front side panel, a driver front side panel, a hood panel and a front panel;
    the front panel being integrally connected to the hood panel only along a top edge of the front panel and a front edge of the hood panel;
    the front panel also being integrally connected to the passenger and driver front side panels only along side edges of the front panel and front edges of the side panels;
    the hood panel extending continuously rearward from the front edge thereof to a rear edge thereof;
    the hood panel being unconnected from said front side panels along side edges of the hood panel except at detachable connection means adapted to allow adjustable connection of the hood panel to the front side panels at the rear edge of the hood panel and adjacent the vehicle windshield, to allow adjustable tightening of the hood panel along the rear edge;
    the passenger and driver front side panels extending rearwardly from the front edges thereof in a continuous protective layer to at least the rear edges of said passenger and driver doors, respectively, passenger and driver front side panels having attachment clips for connection to said doors along said rear edges thereof;
    a rear portion for covering and protecting rear parts of the vehicle; said rear portion having at least two rear side panels for extending along exterior side walls of the vehicle;
    rear portion connection means extending across the rear end of the vehicle for detachably connecting the rear side panels together so that the rear side panels can be adjustably drawn taut along the sides of the vehicle; and
    means for securing front edges of the rear side panels to said vehicle;
    whereby the front, hood and sides of the vehicle are protected against scratching by brush, rocks, and other objects.

2. The protective cover of claim 1 wherein said means for securing front edges of the rear side panels comprises at least one forward belt means which is connected to front edges of each rear side panel and extends across the vehicle to hold the rear side panels against the side walls of the vehicle.

3. The protective cover of claim 1 wherein said means for securing front edges of the rear side panels comprises fastener means adapted to releasably secure front edges of the rear side panels to the vehicle.

4. The protective cover of claim 1 further comprising bumper tie down means for connecting the front portion to a front bumper of the vehicle.

5. The protective cover of claim 1 wherein the passenger and driver front side panels include flaps which extend beyond the rear edges of the passenger and driver doors so as to detachably overlie front edges of the rear side panels;
    and further comprising tear away flap connection means for detachably connecting the flaps over front portions of the rear side panels and for automatically detaching when a vehicle door is opened.

6. The protective cover of claim 5 wherein the flap connection means comprises mating hook and loop type fastener material.

7. The protective cover of claim 1 wherein the front panel is provided with openings through which air and light may pass.

8. The protective cover of claim 1 further comprising means for detachably fastening side panels thereof to the vehicle.

9. The protective cover of claim 8 wherein said means for detachably fastening are fasteners adapted to fasten said side panels adjacent to wheel wells of the vehicle.

10. The protective cover of claim 9 wherein said fasteners include spring clips securable upon the vehicle and having one portion of a snap type fastener which mates with a snap type fastener secured in the side panels.

11. The protective cover of claim 1 wherein said means for detachably securing the hood panel along side edges thereof comprises interengageable hook and loop type fastening materials affixed along the side edges of the hood panel and along top edges of the passenger and driver front side panels.

12. The protective cover of claim 1 further comprising intermediate portions adapted for connection to rear doors of the vehicle.

13. The protective cover of claim 12 wherein the intermediate portions further comprise rear flaps for overlapping the rear portion; and flap connection means for detachably connecting said rear flaps to the rear portion.

* * * * *